R. P. HICKS.
TRACTOR.
APPLICATION FILED OCT. 30, 1919.
1,368,433.
Patented Feb. 15, 1921.
3 SHEETS—SHEET 1.
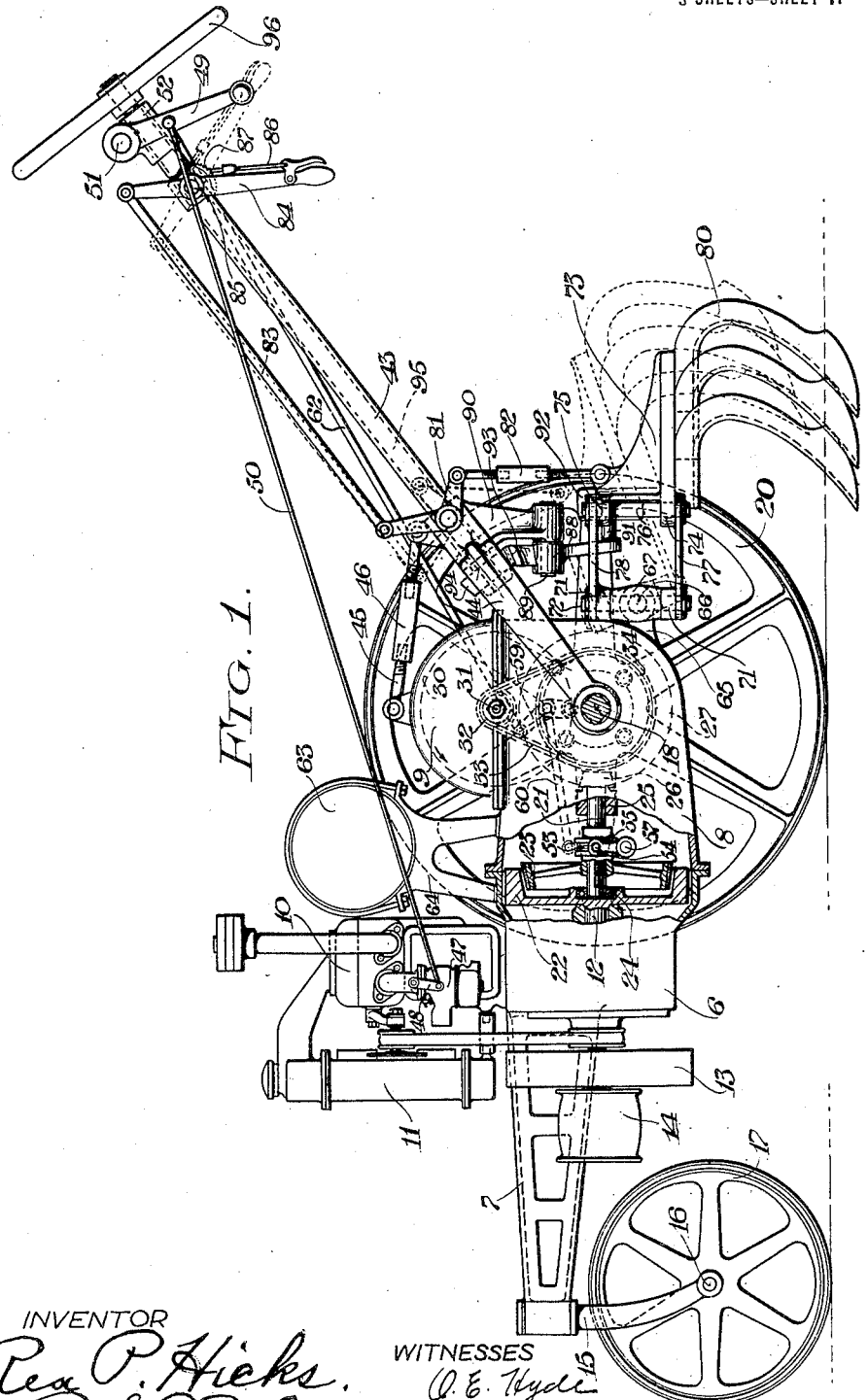
FIG. 1.
INVENTOR
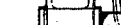

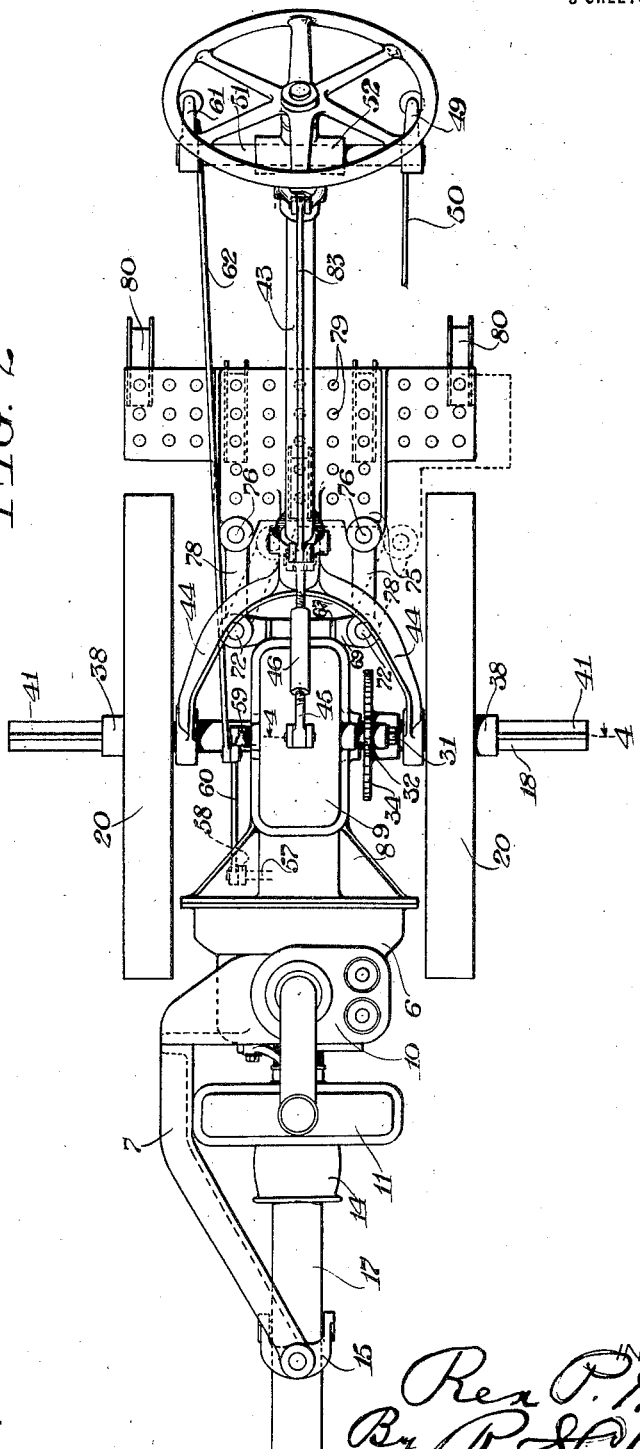

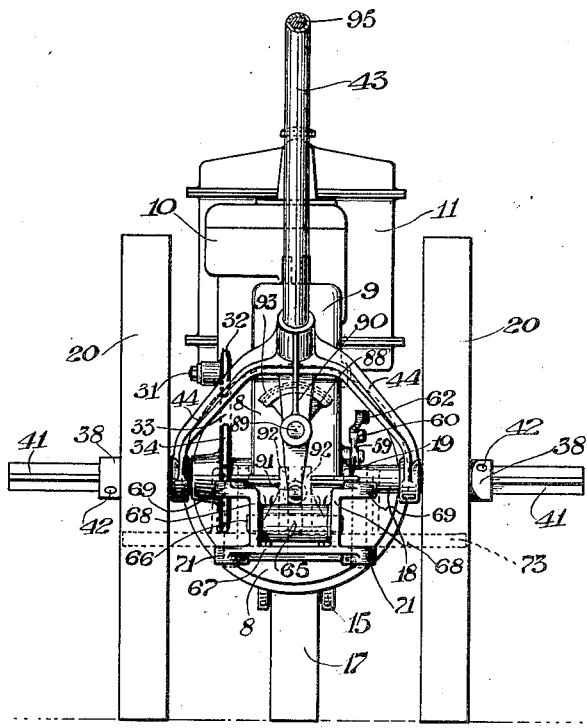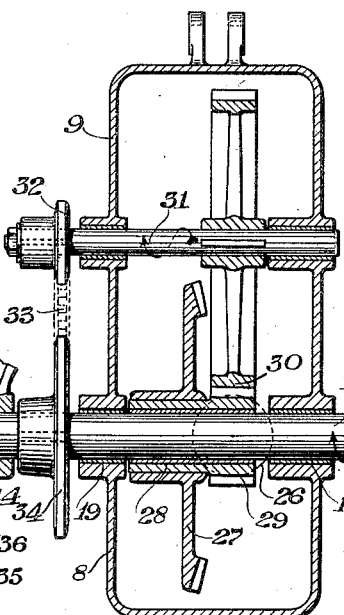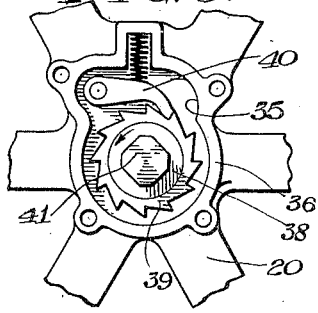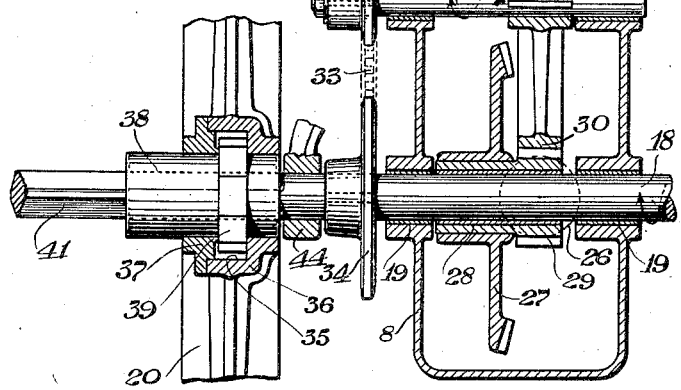

UNITED STATES PATENT OFFICE.

REX P. HICKS, OF MILWAUKEE, WISCONSIN.

TRACTOR.

1,368,433.  Specification of Letters Patent.  Patented Feb. 15, 1921.

Application filed October 30, 1919. Serial No. 334,578.

*To all whom it may concern:*

Be it known that I, REX P. HICKS, a citizen of the United States, and resident of Milwaukee, in the county of Milwaukee and State of Wisconsin, have invented new and useful Improvements in Tractors, of which the following is a description, reference being had to the accompanying drawings, which are a part of this specification.

The invention relates to tractors and more particularly to the type commonly known as a garden tractor.

In the cultivation of some crops, such as corn, where it is desired to cultivate between the plants in a row, it has been necessary to move the entire tractor and its cultivating implement so as to bring the implement between the plants and this is an uncertain and laborious operation. To obviate this difficulty I have provided a construction in which lateral movement of the cultivator tool or tools may be effected relative to the machine so that the machine itself does not need to be shifted to bring one or more of the cultivator tools between the plants in a row for hilling up corn or other vegetables.

A further object of the invention is to provide a simple and efficient means for driving the tractor.

A further object of the invention is to provide a three-wheeled self-propelled garden tractor controlled by the operator who guides it.

The invention further consists in the several features hereinafter set forth and more particularly defined by claims at the conclusion hereof.

In the drawings: Figure 1 is an elevation view of a device embodying the invention, parts being broken away and parts being shown in section;

Fig. 2 is a plan view of the device;

Fig. 3 is a rear view of the device;

Fig. 4 is a detail sectional view taken on the line 4—4 of Fig. 2;

Fig. 5 is a detail view of the differential connection between the wheel and the driven axle.

The frame of the machine is formed by the engine crank case 6, a beam 7 and the transmission casing 8, having a removable section 9. The engine 10, such as an internal combustion engine, with cooling radiator 11, has its drive shaft 12 mounted in the crank case and carries a flywheel 13 and a drive pulley 14 for auxiliary power transmission purposes. The beam 7 is connected to the end of the crank case near one side thereof so as to clear the flywheel and pulley and is then inclined toward the center of the machine so that a forked wheel support 15 journaled in the forward end of the beam lies in the center line of the machine. The support 15 carries an axle 16 upon which is mounted a wheel 17. A drive shaft 18 is journaled in bearings 19 in the transmission casing and carries the traction wheels 20.

Power is transmitted from the shaft 12 to the shaft 18 by means of a shaft 21 drivingly connected with the shaft 12 through a clutch hereinafter described, and a gearing connection between said shaft 12 and the shaft 18.

The clutch for connecting the shafts 12 and 21 in driving relation may be of any suitable construction and in the present instance I show a cone friction clutch consisting of a female friction cone 22 on the shaft 12 and a male friction cone 23 slidably but nonrotatably mounted on the shaft 21 and adapted to be shifted into and out of engagement with the cone 22. The shaft 21 at one end is journaled in an end thrust bearing 24 disposed in the center of cone 22 and a transverse member 25 forming part of the transmission casing receives the other end of said shaft.

The gearing connection between the shaft 12 and the shaft 18 consists of a bevel gear 26 on the shaft 12 meshing with a bevel gear 27 keyed to or formed integral with the hub 28 of a gear 29 loosely mounted on the shaft 18. The gear 29 meshes with a gear 30 keyed to a shaft 31 journaled in the transmission casing and carrying a removable sprocket 32 connected by a chain 33 to a sprocket wheel 34 fixed to the shaft 18. By changing the gear ratio between the sprockets 32 and 34 by employing sprockets 32 of different diameters, the speed of rotation of the shaft 18 may be varied with respect to the drive shaft to best suit the requirements of the work.

The traction wheels 20 each have a casing 35 formed in the hub 36 thereof and a removable hub plate 37. The hub of each wheel is journaled upon a sleeve member 38 carrying a ratchet 39 in the casing 35 and engaged by a spring pressed dog 40 in said casing. By this construction a differential action between the wheels is effected so that one may turn faster than the other when the tractor is making a turn. The ends 41 of the shaft 18 have flat sides so that the members 38 while prevented from rotation with respect to the shaft 18 may be adjusted lengthwise thereof to provide for running the machine in the space between the rows which may vary in width. When adjusted for width the members 38 are locked to the shaft 18 in any suitable manner, as by set screws 42.

A handle 43 has its lower forked portions 44 loosely mounted on the shaft 18 and is adjustably secured in inclined position with respect to the frame by a link 45 connecting said handle to the transmission casing and provided with an adjustable turnbuckle 46.

The engine 10 is provided with the usual throttle valve controlling the passage of mixture from the carbureter 47 and having a crank 48 connected to a control handle 49 by a link 50 or other suitable connecting member. The handle 49 is mounted on a shaft 51 about which it may be turned to adjust the position of the throttle valve. The shaft 51 is carried by a fitting 52 secured to the upper end of the handle 43.

The movable clutch member or cone 23 has an annular groove 53 in the hub thereof in which pins 54, carried by the forked ends 55 of a crank on a shaft 57, are mounted. The shaft 57 is journaled in the transmission casing and carries a crank 58 connected to a lever 59 by a link 60. The lever 59 is mounted to swing on the transmission casing and is connected to a control handle 61 by a link 62. The handle 61 is mounted on the shaft 51 about which it may be turned to move the cone 23 into and out of clutching engagement with the cone 22 through the linkage just described.

A fuel tank 63 is mounted upon a support 64 on the frame and supplies the carbureter. The tank and its support are not shown in Figs. 2 and 3.

A lug 65 projecting from the rear end of the transmission casing 8 carries a shaft 66 and a yoke member 67 has its arms 68 pivotally mounted intermediate their ends on said shaft. These arms 68 have outwardly projecting lugs 69 in line with outwardly projecting lugs 71 projecting from the transverse portion of the yoke and pins 72 are vertically mounted in these alined lugs. An implement carrying member 73 is also provided with outwardly projecting lugs 74 and 75 on the forward end thereof in which pins 76 are vertically mounted. Links 77 are pivotally connected to the lower ends of the pins 72 and 76 and links 78 are pivotally connected to the upper ends of the pins 72 and 76. By this construction the member 73 may be swung in a vertical plane upon the shaft 66 by a swinging of the frame formed by the members 67 and 73, pins 72 and 76, and links 77 and 78, and said member 73 may also be swung laterally through swinging of the links 77 and 78, said links together with the members 67 and 73 which they connect forming a parallelogram frame.

The member 73 has a plurality of holes 79 in its base by which the various agricultural implements may be secured by bolts passed through said holes and clamping the implement to said member as the cultivator teeth 80.

The vertical swinging of the implement carrying frame is effected by a forked bell crank lever 81 mounted on the handle 43 and operatively connected at one end by an adjustable link 82 to the member 76 and at its other end by a link 83 to a lever 84 pivotally mounted on a shaft 85 carried by the handle 43. By turning this lever on its shaft the frame may be raised to bring the implement out of the soil or it may be lowered to set the implements for the proper depth and is then held in adjusted position by locking the lever 84 by means of the usual rod 86 carried by the lever and engageable with the toothed segment 87 mounted on the handle 43.

The lateral swinging of the implement carrying frame is effected by a vertically swinging lever 88 pivotally mounted intermediate its end upon a shaft 89 on a bracket 90 depending from the handle 43 and carrying a pin 91 movable in a slot formed by spaced lugs 92 on the member 76. The lever 87 carries or has formed thereon a segmental bevel gear 93 which meshes with a bevel gear 94 on the end of a shaft 95. This shaft passes through the straight tubular portion of the handle and is turned by means of a handwheel 96 on its upper end. The turning of the handwheel will, through the shaft 95, gears 94 and 93, shift the lever 87 which in turn moves the member 76 laterally, such movement being permitted by the links 77 and 78 and being independent of the vertical adjustment of said member 76. In this way the implements may be moved to a position for cultivating between the plants in a row without shifting the whole machine.

It will be noted that the controls 49 and 61, as well as the lever 84, are located near the handwheel 96 for ready manipulation by the operator who grasps the wheel 96 to guide the machine and turns it when he desires to shift the implement frame laterally. The starting and stopping of the machine is controlled by the clutch, the operation of the engine by the throttle control, the vertical position of the implements by the shifting of the lever 84, and the lateral position of the implements by the turning of the handwheel.

I desire it to be understood that this invention is not limited to any specific form or arrangement of parts except in so far as such limitations are specified in the claims.

What I claim as new and desire to secure by Letters Patent is:

1. In a tractor, the combination, with the main frame, of a handle operatively connected to said frame, a shaft carried by the handle, means for turning said shaft, a member vertically pivotally mounted on the main frame, an implement-carrying member, parallel links connecting said members together for lateral movement of said implement-carrying member with respect to said main frame, means operatively connecting said implement-carrying member with said shaft for lateral movement thereof on the turning of said shaft, a lever carried by the handle, and means connecting said lever with said implement-carrying member for vertical movement of said member by said lever.

2. In a tractor, the combination, with a main frame, of a handle operatively connected thereto, an implement-carrying frame comprising a pair of spaced members connected together by parallel links, means for vertically pivotally mounting said implement-carrying frame on the main frame, a lever mounted on the handle and operatively connected to said implement-carrying frame for raising and lowering the latter, and means carried by said handle and connected to said implement-carrying frame for moving the implements carried thereby laterally of the main frame.

3. In a tractor, the combination, with a main frame, of a handle operatively connected thereto, a laterally swinging implement-carrying frame including an implement-carrying member having a vertically disposed slot, a lever carried by the handle and provided with a pin movable in said slot, and means carried by the handle and operatively connected to said lever for swinging said lever and thereby moving said member laterally of the main frame.

4. In a tractor, the combination, with a main frame, of a handle operatively connected thereto, a laterally swinging implement-carrying frame including an implement-carrying member having a vertically disposed slot, a lever carried by the handle and provided with a pin movable in said slot to move said member laterally with respect to said frame, a revoluble shaft in said handle, and a gearing connection between said shaft and said lever.

5. In a tractor, the combination, with the main frame, of a handle operatively connected thereto, an implement-carrying member connected to said frame for lateral and vertical movement, a lever carried by the handle and connected to said member to move it laterally on a swinging of said lever, a revoluble shaft in said handle, a gearing connection between said shaft and lever, and a lifting lever carried by said handle and connected to said member for effecting vertical movement of the latter.

6. In a tractor, the combination, with the main frame, of a handle operatively connected thereto, an implement-carrying member connected to said frame for lateral and vertical movement, a revoluble shaft in said handle, means operatively connecting said member with said shaft for lateral movement thereof on the turning of said shaft, a lever carried by the handle, and means connecting said lever with said member for raising and lowering the latter.

In testimony whereof, I affix my signature.

REX P. HICKS.